United States Patent
Smith et al.

(10) Patent No.: US 7,516,033 B2
(45) Date of Patent: Apr. 7, 2009

(54) METHOD AND APPARATUS FOR IDENTIFYING ECHO SOURCES IN A COMMUNICATION PATH

(75) Inventors: Wallace F. Smith, Sea Girt, NJ (US); James H. James, Farmingdale, NJ (US); David B. Ramsden, Wall, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 207 days.

(21) Appl. No.: 11/426,226

(22) Filed: Jun. 23, 2006

(65) Prior Publication Data

US 2007/0299622 A1    Dec. 27, 2007

(51) Int. Cl.
*G06F 19/00*    (2006.01)

(52) U.S. Cl. .......................... 702/90; 370/201; 370/289; 379/29.01; 379/406.01; 379/406.02; 702/189

(58) Field of Classification Search .................. 702/79, 702/90, 85, 107, 108, 127, 189, 190, 191; 379/3, 29.1, 406.01, 406.02, 406.03, 406.05; 370/201, 276, 286, 289
See application file for complete search history.

(56) References Cited

U.S. PATENT DOCUMENTS

| | | | | |
|---|---|---|---|---|
| 6,078,567 A | * | 6/2000 | Traill et al. | 370/289 |
| 6,434,110 B1 | * | 8/2002 | Hemkumar | 370/201 |
| 6,970,559 B2 | * | 11/2005 | Zdenek et al. | 379/406.01 |
| 7,003,098 B2 | | 2/2006 | Smith | |
| 7,068,757 B1 | * | 6/2006 | Burnett | 379/29.01 |
| 2004/0228473 A1 | | 11/2004 | Smith | |

* cited by examiner

*Primary Examiner*—John H Le
(74) *Attorney, Agent, or Firm*—Akerman Senterfitt; Ed Guntin

(57) ABSTRACT

A method and apparatus for identifying echo sources in a communication path. A system that incorporates teachings of the present disclosure may include, for example, an echo measurement device (EMD) having a transmit module to transmit an echo canceller deactivation signal in a communication path of the communication system, wherein the echo canceller deactivation signal deactivates one or more echo cancellers in said communication path. The transmit module can also transmit a test signal in the communication path which is looped back at an end point identified as having an echo problem, wherein the test signal is transmitted at a remote location from the end point. The EMD can further include a detection module to detect one or more echo signals associated with the test signal. Additional embodiments are disclosed.

19 Claims, 4 Drawing Sheets

100

200

Loop back delay (Delay 1) = $t_1 + t_2 + t_3 + t_4$

Echo Loopback delay (Delay 2) = $t_1 + t_2 + t_3$ + echo source delay + $t_2 + t_3 + t_4$ Echo Delay to B end (Delay 2 − Delay 1) = $t_3$ + echo source delay + $t_2$

300

METHOD AND APPARATUS FOR IDENTIFYING ECHO SOURCES IN A COMMUNICATION PATH

FIELD OF THE DISCLOSURE

The present disclosure relates generally to diagnostic devices, and more specifically to a method and apparatus for identifying echo sources in a communication path.

BACKGROUND

When a subscriber of a communication system reports a voice echo at a service node of said system, a service provider generally deploys a field engineer with test equipment to diagnose the reported problem at its source. It can take some time before the field engineer arrives at the subscriber's location. Moreover, such testing can be costly to the service provider.

A need therefore arises for a method and apparatus for identifying echo sources in a communication path.

DETAILED DESCRIPTION

Embodiments in accordance with the present disclosure provide a method and apparatus for identifying echo sources in a communication path.

In a first embodiment of the present disclosure, an echo measurement device (EMD) can have a transmit module to transmit an echo canceller deactivation signal in a communication path of the communication system, wherein the echo canceller deactivation signal deactivates one or more echo cancellers in said communication path, and transmit a test signal in the communication path which is looped back at an end point identified as having an echo problem, wherein the test signal is transmitted at a remote location from the end point. The EMD can further include a detection module to detect one or more echo signals associated with the test signal.

In a second embodiment of the present disclosure, a computer-readable storage medium in an EMD can have computer instructions for transmitting an echo canceller deactivation signal in a communication path of a communication system for deactivating one or more echo cancellers in said communication path, and detecting one or more echo signals associated with a test signal transmitted in the communication path and looped back at an end point identified as having an echo problem. The test signal is transmitted at a remote location from the end point.

In a third embodiment of the present disclosure, a method can have the steps of deactivating in a communication path of a communication system one or more echo cancellers in said communication path, and identifying timing characteristics of one or more echo signal sources from a test signal transmitted in the communication path and looped back at an end point identified as having an echo problem. The test signal is transmitted at a remote location from the end point.

In a fourth embodiment of the present disclosure, a loopback apparatus can have a loopback circuit applied to a end point of a communication path in a communication system for identifying timing characteristics of one or more echo signal sources at a remote location according to a test signal transmitted in the communication path and looped back at the end point by the loopback circuit.

Figure 1:
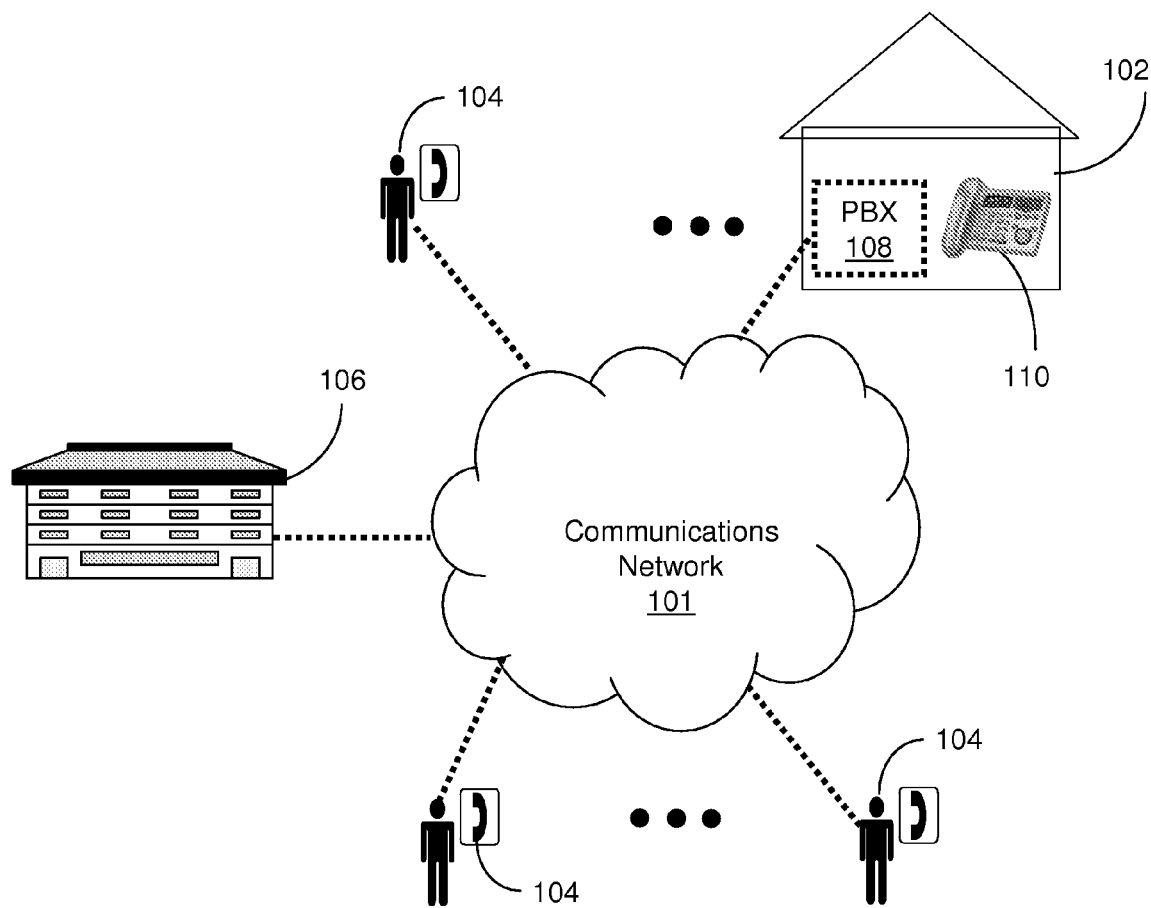
FIG. 1 depicts an exemplary embodiment of a communication system.

FIG. 1 depicts an exemplary embodiment of a communication system 100. The communication system 100 comprises a communications network 101 coupled to a building 102 that houses residential or commercial enterprise communication elements, a number of fixed and roaming end users 104 utilizing services of the communications network 101, and a centralized office 106.

The communications network 101 can utilize packet and/or circuit-switched communications technology such as IP routers and time division multiplexed (TDM) circuit-switched network switches. The communications network 101 can also utilize a combination of wireless and wired interconnections. For example, the communications network 101 can include WiFi access points in residences or commercial enterprises, and WiMax or cellular cell sites dispersed in a wide geographic region. The cellular sites can utilize any number of common frequency-reuse protocols such as GSM, CDMA, UMTS, TDMA, and so on. As a hybrid communication system, the communications network 101 can support Voice over IP (VoIP) and Plain Old Telephone Services (POTS) communications.

In a commercial setting, the building 102 can include a PBX (Private Branch Exchange) coupled to a number of terminals 110 supporting VoIP or POTS communications. In a residential setting, VoIP or POTS terminals can be coupled by way of standard wired interfaces to a Service Area Interface (SAI) serving a number of residences by way of a remote central office housing common TDM switching and routing equipment.

The centralized office 106 can serve the function of diagnosing issues with the network 101. The centralized office 106 can be an integral part of a central office housing TDM and IP networking equipment. Thus the centralized office 106 can serve the function of testing and providing communication services to fixed or roaming end users 104. The fixed end users 104 can receive communication services by way of public phone booths, residences or commercial enterprises, while roaming end users 104 can represent subscribers of WiMax and/or cellular services provided by the network 101.

Figure 2:
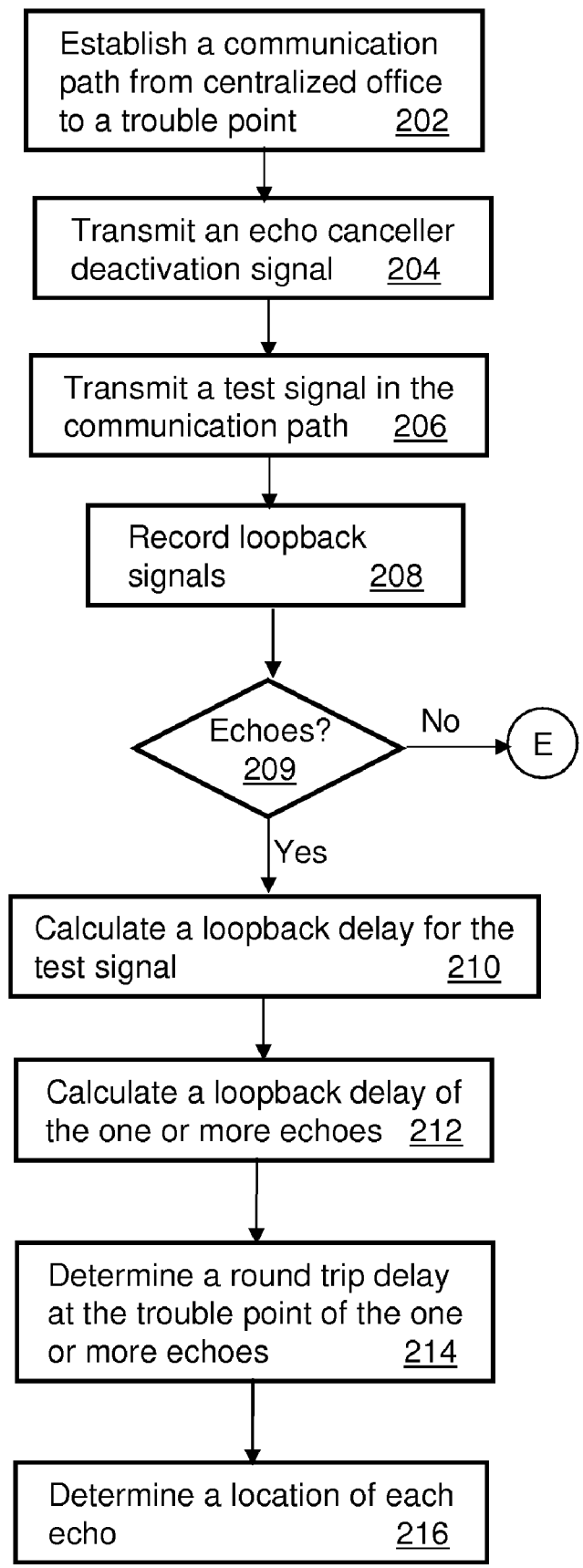
FIG. 2 depicts an exemplary method operating in an echo measurement device coupled to the communication system.
Figure 3:
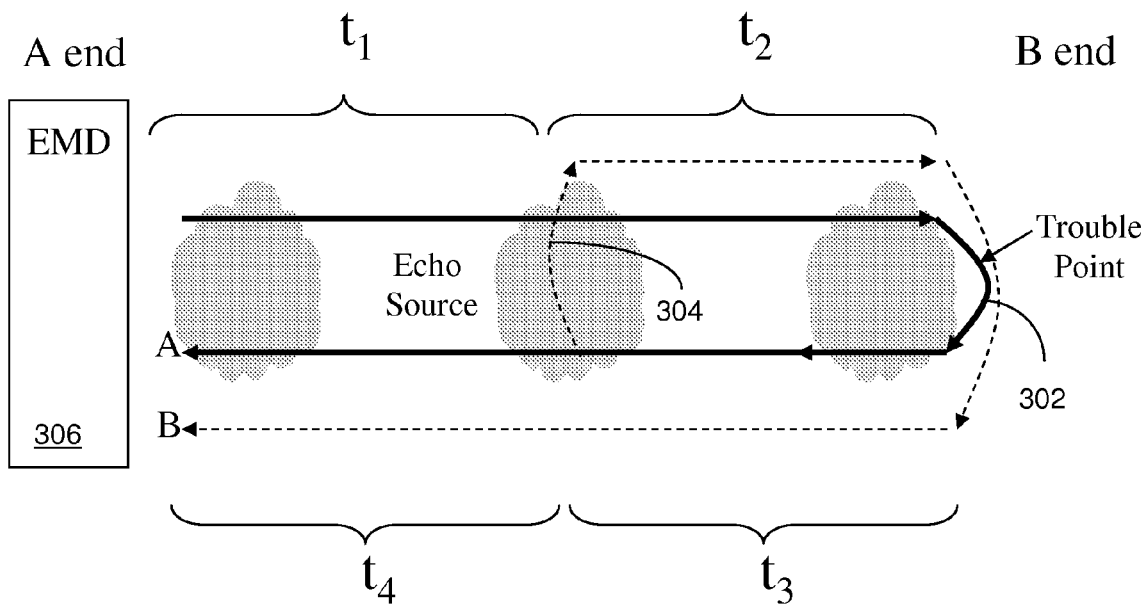
FIG. 3 depicts an exemplary block diagram illustrating the method of FIG. 2 for measuring echo sources in a communication path of the communication system.
Figure 3:
Figure 3:
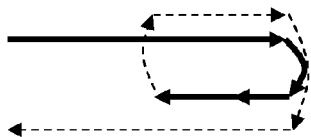
Figure 3:

FIG. 2 depicts an exemplary method 200 operating in an echo measurement device housed by the centralized office 106 (or at any location in the network) for diagnosing echoes in the aforementioned hybrid communications network 101. Method 200 begins with step 202 in which personnel of the communications network 101 establish by common means a communication path from the centralized office 106 to a trouble point identified by a subscriber of the network 101. FIG. 3 depicts an exemplary block diagram of the communication path established in step 202.

An echo measurement device (EMD) 306 of the centralized office 106 can be represented by an Agilent VQT, a GL Communications T1/E1 analyzer, or a proprietary diagnostic system with digital processing capabilities. The location of the EMD 306 is illustrated as a first end point (A) coupled to a second end point (B) by way of the communication path. End point A can be remotely located from end point B by tens or thousands of miles. End point B represents where the trouble was reported. To enable testing, a loopback apparatus 302 is used to loopback signals transmitted by the EMD 306. The loopback apparatus 302 can include a loopback circuit coupled to a common telephonic interface such as an RJ11 jack. The loopback circuit establishes a signal loop at end point B by interconnecting transmit and receive signals in the communication path (e.g., connecting pins 1 & 3 together, and pins 2 & 4 together).

In step 204, the EMD 306 transmits an echo canceller deactivation signal which deactivates the echo cancellers located in the communication path. The deactivation signal can represent a signal having an operating frequency of 2100 Hz with 180 degree phase reversals occurring every 450 ms. Once the echo cancellers have been deactivated, the EMD 306 proceeds to step 206 where it transmits a test signal in the communication path. The test signal can represent a limited burst signal on the order of for example 25 ms. The burst signal can be short so that multiple echoes, if present, can be detected during the analysis of the communication path. The burst signal can operate on a single or multiple frequencies that are outside a range of the operating frequency of the echo canceller deactivation signal.

Once the burst signal is transmitted, the EMD 306 records in step 208 loopback signals. From the recorded signal bursts of energy can indicate whether there are echoes and how many corresponding echo sources may be present. If no echoes are detected in step 209, the EMD 106 can be programmed to cease operation. Otherwise, the EMD 306 proceeds to step 210 where it calculates a loopback delay (Delay 1) for the test signal. As depicted in FIG. 3 Delay 1 is calculated as a travel time of the test signal to an echo source (t1) plus a travel time of the test signal from the echo source to end point B (t2) plus a travel time from end point B to the echo source (t3) plus a travel time from the echo source to end point A (t4). Hence, Delay 1 is equal to t1 +t2 +t3 +t4.

In step 212 the EMD 306 calculates a loopback delay (Delay 2) for each of the echo sources. FIG. 3 illustrates this calculation for a single echo source. Delay 2 is equal to a travel time of the test signal to the echo source (t1) plus a travel time of the test signal from the echo source to end point B (t2) plus at travel time from end point B to the echo source (t3) plus a delay for the echo source to loopback the test signal (echo source delay) plus a travel time of the test signal from the echo source to end point B (t2) plus at travel time from end point B to the echo source (t3) plus a travel time from the echo source to end point A (t4). Hence, Delay 2 is equal to t1 +t2 +echo source delay+t2 +t3 +t4.

To calculate a roundtrip delay from end point B to the echo source, the EMD 306 in step 214 subtracts Delay 1 from Delay 2. The echo delay to end point B is t3 +echo source delay +t2. From this delay, the EMD 106 can calculate an approximate location of the echo source in the communication path in step 216. With this information a field engineer can be called to correct a malfunctioning echo canceller or add an echo canceller in the approximate location it is needed to correct the echo.

Although method 200 is demonstrated for a single echo source, a similar procedure can be applied to multiple echo sources. Additionally, the foregoing embodiments of method 200 can save substantial cost incurred by a service provider of the communications system 100. Operational expenses are reduced by remotely diagnosing echo problems without deploying a field engineer to locations with reported issues. Equally as important, the foregoing method provides a means for rapid testing since all testing can take place at a centralized office 106 or at other locations in the communication system 100. The EMD 306 can be programmed for example to test a communication path as directed by a customer service agent of the service provider even though the agent may not have familiarity or experience with the testing procedure. If for example the EMD 306 detects an echo confirming the subscriber's reported problem, the customer service agent can establish a trouble ticket which can then be analyzed by a test engineer that can determine whether field repairs are necessary or an additional echo canceller is required.

It would be evident to an artisan with ordinary skill in the art that the aforementioned embodiments of method 200 can be modified, reduced, or enhanced without departing from the scope and spirit of the claims described below. For example the EMD 306 can be programmed to transmit a variety of burst signals to validate the presence of echoes at multiple frequencies rather than at a single frequency. The EMD 306 can be programmed to generate trouble tickets with a suggested remedy for the echoes detected. Additionally, the EMD 306 can be programmed to measure an echo path loss (EPL) from a power measurement of a loopback of the test signal (P1), a power measurement for each of the one or more echo signals (e.g., P2), and an expected power loss at the end point (L) where the communication path is looped back (e.g., EPL=P2−P1−L).

These are but a few examples of modifications that can be applied to the present disclosure. Accordingly, the reader is directed to the claims below for a fuller understanding of the breadth and scope of the present disclosure.

Figure 4:
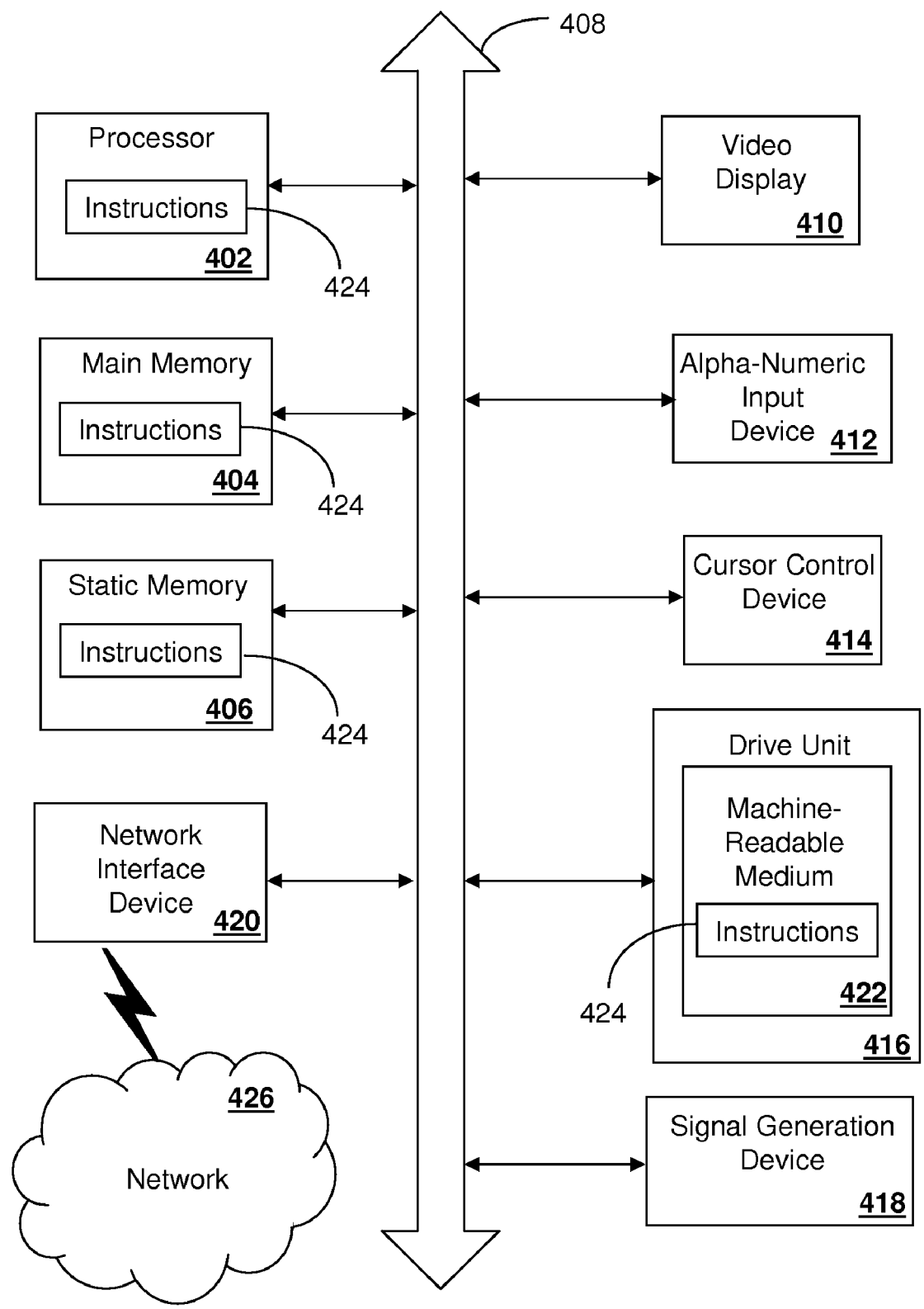
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An echo measurement device (EMD), comprising:
    a transmit module to:
        transmit an echo canceller deactivation signal in a communication path of the communication system, wherein the echo canceller deactivation signal deactivates one or more echo cancellers in said communication path, and
        transmit a test signal in the communication path which is looped back at an end point identified as having an echo problem, wherein the test signal is transmitted at a remote location from the end point, wherein the test signal comprises a limited burst signal of one or more frequencies operating outside a range of an operating frequency of the echo canceller deactivation signal; and a detection module to detect one or more echo signals associated with the test signal.

2. The EMD of claim 1, wherein the echo canceller deactivation signal comprises a signal having an operating frequency with periodic phase reversals.

3. The EMD of claim 1, comprising a determination module to determine an approximate source location in the communication path for each of the one or more echo signals according to a round trip delay for each of the test signal and the one or more echo signals.

4. The EMD of claim 1, comprising:
a recording module to record loopback signals;
a calculation module to:
calculate a loopback delay of the test signal from the loopback signals;
calculate a loopback delay associated with each of the one or more echo signals detected in the loopback signals; and
a determination module to determine a round trip delay at the end point for each of the one or more echo signals according to a difference between the loopback delay of the test signal and the loopback delay associated with each of the one or more echo signals.

5. The EMD of claim 4, wherein the determination module determines an approximate source location for each of the one or more echo signals according to the round trip delay at the end point for each of the one or more echo signals.

6. The EMD of claim 1, wherein the test signal is looped back at the end point by a loopback apparatus coupled to the end point.

7. A computer-readable storage medium in an echo measurement device (EMD), comprising computer instructions for:
transmitting an echo canceller deactivation signal in a communication path of a communication system, wherein the echo canceller deactivation signal deactivates one or more echo cancellers in said communication path; and
detecting one or more echo signals associated with a test signal transmitted in the communication path and looped back at an end point identified as having an echo problem, wherein the test signal is transmitted at a remote location from the end point, wherein the test signal comprises a limited burst signal of one or more frequencies operating outside a range of an operating frequency of the echo canceller deactivation signal.

8. The computer-readable storage medium of claim 7, wherein the echo canceller deactivation signal comprises a signal having an operating frequency with periodic phase reversals.

9. The computer-readable storage medium of claim 7, comprising computer instructions for determining an approximate source location in the communication path for each of the one or more echo signals according to a round trip delay for each of the test signal and the one or more echo signals.

10. The computer-readable storage medium of claim 7, comprising computer instructions for:
calculating a loopback delay of the test signal;
calculating a loopback delay associated with each of the one or more echo signals; and
determining a round trip delay at the end point for each of the one or more echo signals according to a difference between the loopback delay of the test signal and the loopback delay associated with each of the one or more echo signals.

11. The computer-readable storage medium of claim 10, comprising computer instructions for determining an approximate source location for each of the one or more echo signals according to the round trip delay at the end point for each of the one or more echo signals.

12. The computer-readable storage medium of claim 10, comprising computer instructions for measuring an echo path loss from a power measurement of a loopback of the test signal, a power measurement for each of the one or more echo signals, and an expected power loss at the end point where the communication path is looped back.

13. A method, comprising:
deactivating in a communication path of a communication system one or more echo cancellers in said communication path; and
identifying timing characteristics of one or more echo signal sources from a test signal transmitted in the communication path and looped back at an end point identified as having an echo problem, wherein the test signal is transmitted at a remote location from the end point, and wherein the test signal comprises a limited burst signal of one or more frequencies operating outside a range of an operating frequency of the echo canceller deactivation signal.

14. The method of claim 13, comprising transmitting an echo canceller deactivation signal to deactivate the one or more echo cancellers.

15. The method of claim 13, comprising determining an approximate location in the communication path for each of the one or more echo signal sources according to a round trip delay for each of the test signal and one or more echo signals associated with the echo signal sources.

16. The method of claim 13, comprising:
calculating a loopback delay of the test signal;
calculating a loopback delay associated with each of one or more echo signals associated with the one or more echo signal sources; and
determining a round trip delay at the end point for each of the one or more echo signals according to a difference between the loopback delay of the test signal and the loopback delay associated with each of the one or more echo signals.

17. The method of claim 16, comprising determining an approximate location for each of the one or more echo signal sources according to the round trip delay at the end point of each of the one or more echo signals.

18. A loopback apparatus, comprising a loopback circuit applied to an end point of a communication path in a communication system for identifying timing characteristics of one or more echo signal sources at a remote location according to a test signal transmitted in the communication path and looped back at the end point by the loopback circuit, wherein the test signal comprises a limited burst signal of one or more frequencies operating outside a range of an operating frequency of the echo canceller deactivation signal.

19. The loopback apparatus of claim 18, wherein the loopback circuit establishes a signal loop at the end point by interconnecting transmit and receive signals in the communication path.

* * * * *